United States Patent
Van Kuijk et al.

(10) Patent No.: US 8,585,315 B2
(45) Date of Patent: Nov. 19, 2013

(54) CONNECTING ELEMENT AND ASSOCIATED CONNECTION ASSEMBLY

(75) Inventors: Ewald Van Kuijk, Eindhoven (NL); Suzanne Danielle Landwehr Johan, Son (NL)

(73) Assignee: Vogel's Holding B.V., Eindhoven (NL)

( * ) Notice: Subject to any disclaimer, the term of this patent is extended or adjusted under 35 U.S.C. 154(b) by 557 days.

(21) Appl. No.: 12/966,121

(22) Filed: Dec. 13, 2010

(65) Prior Publication Data

US 2012/0056061 A1 Mar. 8, 2012

(30) Foreign Application Priority Data

Sep. 2, 2010 (NL) ...................................... 2005303

(51) Int. Cl.
*F16M 13/00* (2006.01)
(52) U.S. Cl.
USPC ................. 403/325; 248/222.51; 248/222.52; 361/679.3
(58) Field of Classification Search
USPC .......................... 403/252–254, 325, 327–329; 248/220.21, 220.22, 222.51, 222.52, 248/346.01, 346.03, 346.06, 349.1, 346.5; 361/679.29, 679.3
See application file for complete search history.

(56) References Cited

U.S. PATENT DOCUMENTS

| | | | | |
|---|---|---|---|---|
| 4,508,468 A | * | 4/1985 | Irwin ............................. | 403/328 |
| 4,545,697 A | * | 10/1985 | Verdenne et al. ............. | 403/230 |
| 4,586,843 A | * | 5/1986 | Heng et al. .................... | 403/252 |
| 4,795,118 A | | 1/1989 | Kosugi et al. | |
| 5,020,866 A | * | 6/1991 | McIlwraith ................ | 312/265.4 |
| 6,446,913 B1 | * | 9/2002 | Schroeder .................... | 248/27.1 |
| 6,487,929 B2 | * | 12/2002 | Schneider ....................... | 74/527 |
| 2007/0012830 A1 | | 1/2007 | Prendergast | |
| 2008/0271288 A1 | * | 11/2008 | Senatori .......................... | 16/221 |
| 2010/0072334 A1 | | 3/2010 | Le Gette et al. | |
| 2011/0097141 A1 | * | 4/2011 | Brown .......................... | 403/286 |
| 2012/0111881 A1 | * | 5/2012 | Gaddis et al. ................. | 220/752 |
| 2012/0267491 A1 | * | 10/2012 | Chiu ......................... | 248/221.11 |

FOREIGN PATENT DOCUMENTS

| | | |
|---|---|---|
| DE | 196 25 729 | 1/1998 |
| GB | 2 424 821 | 10/2006 |
| GB | 2 452 083 | 2/2009 |

* cited by examiner

*Primary Examiner* — Joshua Kennedy
(74) *Attorney, Agent, or Firm* — Barnes & Thornburg LLP (57) ABSTRACT

A first connecting element is used in combination with a second connecting element and comprises mounting equipment for mounting the first connecting element in an environment, a base body, two opposite hook members, each provided with a hook edge for engagement behind two respective directly opposed second hook edges forming part of the second connecting element, which two hook edges are positioned directly opposite each other, facing away from each other. The hook members are movable towards each other against a first spring force and, on account of the first spring force, away from each other between a connecting position and a disconnecting position. The connecting element further comprises a stop surface for abutment, in the connecting position, under a second spring force against a second stop surface which forms part of the second connecting element and which is directed towards the second hook edges.

16 Claims, 7 Drawing Sheets

CONNECTING ELEMENT AND ASSOCIATED CONNECTION ASSEMBLY

BACKGROUND

The present disclosure relates to a first connecting element for use in combination with a second connecting element, as well as such a combination and a holder element for use in such a combination The present disclosure relates to a first connecting element for use in combination with a second connecting element, the first connecting element and second connecting element can be manually connected to and disconnected from each other. More specifically, the present disclosure relates to such a first connecting element as can be used in a positioning system for a mobile device comprising a flat housing and a flat display screen on the front side of the device.

The present disclosure in particular, but not exclusively, relates to a first connecting element such as can be used with a positioning system for the device that was introduced on the market under the brand name iPad® by the Apple® company in the spring of 2010, or for a comparable device such as devices generally known as tablet pc's. The control of such a device can to a significant extent take place via the display, which is of the touchscreen type. Although such a device can be used as a separate device, for example while lying on a table or being held in a user's hand, it is advantageous in the case of some applications if the device is positioned in a particular space. Such a space may be a room of a building but also, for example, the interior of a car. Further, such an application may include the display of the mobile device to be used for displaying a film (e.g., during a car ride) or a recipe (e.g., in a kitchen environment). In particular, because of the touch screen operation and also because of the larger dimensions and the greater weight of the above-mentioned mobile computing device in comparison to that of mobile telephones, there is a need for increased stability for a positioning system such as the iPad® and similar devices in comparison to positioning systems for smaller mobile telephones.

Conventionally, a positioning system for an iPad® has been marketed under the name of ModulR®. That system comprises a rectangular casing, on the inner side of which an iPad® can be clampingly accommodated. On the outer side, the casing is provided with connecting legs near the corners thereof, which connecting legs are configured as projecting parts. To enable mounting thereof to a wall, the ModulR system also comprises a wall element, whose outer circumference joins that of the casing, except at the location of the corners. Holes are provided in the wall elements, via which the wall element can be screwed to a wall. The wall element further comprises grooves into which the connecting legs can be moved. The width of the groove decreases along part of the length, so that the connecting legs can be snapped in place in the grooves and the casing, with the iPad® clamped therein, can be attached to the wall element.

Important drawbacks of that system include the fact that is quite visibly present on the wall when no casing carrying an iPad® is connected to the wall element which, for aesthetic reasons, will not be universally appreciated. This is partially because of the wall element's dimensions. In addition, the orientation in which the wall element is mounted on the wall also determines the orientation of the casing and thus of the display of the iPad®. If a user opts for a landscape orientation of the wall element, it is not possible to position the display in portrait orientation on a wall.

A drawback of the use of connecting legs on the rear side of the casing is that in the case of the iPad®, the connecting legs mar the design of the iPad®, which is very austere, without any projecting parts. In general, it can be stated that most mobile devices do not have any parts that project to a substantial extent. In variants of the ModulR system, an element such as the above-described wall element is attached to the end of a pivoted arm that can be fixed to a wall or to the rear side of a head restraint of a car seat. Drawbacks comparable to those described above apply thereto.

SUMMARY

The present disclosure provides a first connecting element that can be used with a positioning system for a mobile device, such as in particular, but not exclusively, an iPad®. The positioning system makes it possible to realize a very reliable connection of the first connecting element with the second connecting element as well as makes it possible to use an austere design for the components of the positioning system, with a minimum of projecting parts. In addition, the dimensions of at least the first connecting element remain within bounds. The austere look of the positioning system can match the style of the mobile device that is positioned by the positioning system, so that the design of the mobile device in question is marred as little as possible by the positioning system.

DETAILED DESCRIPTION

The present disclosure provides a first connecting element that comprises mounting equipment for mounting the first connecting element in the environment where the first connecting element is to be used. The first connecting element further comprises a base body, two opposite hook members, each provided with a hook edge for engagement behind two respective directly opposed second hook edges forming part of the second connecting element, which two hook edges are positioned directly opposite each other, facing away from each other. The hook members are movable towards each other against spring force and, on account of the spring force, away from each other relative to the base body between a connecting position, in which the hook edges can engage behind the associated second hook edge of the second connecting element, and a disconnecting position, in which the hook edges are detached from the associated hook edges of the second connecting element.

The first connecting element further comprises a stop surface for abutment, in the connecting position, under a spring force against a second stop surface which forms part of the second connecting element and which is directed towards the second hook edges. The connecting element, in a connected condition thereof, is clamped between the hook edges and the second stop surface of the second connecting element with its hook edges and stop surface in the connecting position. The magnitude of the spring force increases upon movement, in the connected condition, from the connecting position to the disconnecting position.

The first connecting element further comprises guide for guiding the movement of the hook members between the connecting position and the disconnecting position relative to the base body. The guide comprises a guide part of the base body for each of the hook members as well as guide members forming part of each of the hook members. The guide members are guided in respective straight guide directions by the associated guide upon movement of the hook members between the connecting position and the disconnecting position.

The magnitude of the spring force increases upon movement from the connecting position to the disconnecting position. This provides an opposing force of an increasing magnitude to counteract a problem of a tendency that the first connecting element may be disconnected from the second connecting element, This is not a problem when the connecting element is intentionally disconnected from the second connecting element, but rather, the opposing force has the advantage that unintentional disconnection, for example, when someone accidentally bumps against the mobile device being positioned by the positioning system, is prevented.

Additionally, the guide of the hook members guide in rectilinear direction so that, although the hook edges of the first connecting element and the hook edges of the second connecting element move relative to each other upon connection and disconnection, their relative orientation remains unchanged. As a result, a predictable connecting behaviour is realized.

A very suitable manner of causing the magnitude of the spring force to increase upon movement from the connecting position to the disconnecting position can be realized if the two guide directions include a guide angle with each other and wherein the point of the guide angle is oriented away from the stop surface. Moving the hook members, and thus, the hook edges towards each other from a connected condition results in the stop surface being pushed further in the direction of the second stop surface, at least initially, as a result of which an increased resistance against disconnection is created.

The magnitude of the guide angle preferably ranges between 140 degrees and 175 degrees.

Alternatively, or in combination with the embodiment discussed in the foregoing, the two hook edges of the first connecting element may each have a hook surface, which hook surfaces include a hook angle with each other, with the point of the hook angle being oriented in the direction of the stop surface. The hook surface is the surface of the hook edge that moves along the second hook edge upon connection or disconnection. The aspect according to which the point of the hook angle is oriented in the direction of the stop surface is to be understood to mean that the lines which determine the hook angle in line with the hook surfaces extend from the hook surface in question to the stop surface.

An advantageous magnitude of the hook angles is an angle between 140 degrees and 175 degrees.

The stop surface may form part of a stop member made of a resilient, preferably plastic, material for providing the second spring force obtained as a result of the stop member being depressed upon abutment of the stop surface against the second stop surface. The stop member may form an elastic cushion, as it were.

The present disclosure further relates to a combination of a first connecting element according to the disclosure as described in the foregoing and a second connecting element as discussed above. Such a combination may form a complete positioning system or form part thereof.

The second connecting element is possibly at least substantially ring-shaped, into which ring shape the connecting element can be partially inserted upon connection of the connecting element to the second connecting element, wherein the second connecting element is provided with the second stop surface on the side of the ring shape that is remote from the connecting element in the connected condition.

It is noted that the concept "ring-shaped" as used herein does not explicitly imply that a circular shape is used. The ring shape may also be a rectangular shape, more specifically a square shape, for example.

If the hook edges on the second connecting element form part of the circular edge, it becomes possible to have the connecting element make at least one complete, possibly stepless, rotation relative to the connecting element. The ring shape is indeed a circular shape in that case. Thus, a display screen that is to be positioned by means of the combination according to the disclosure can be positioned in different orientations (portrait or landscape).

Specifically with a view to using the combination for positioning a mobile device, the second connecting element may form part of a holder element which is provided with a plate-shaped body which is provided with upright edges along at least part of the circumferential edge on the inner side for clampingly accommodating a mobile device with a flat display therebetween, wherein the second connecting element is connected to the plate-shaped body.

If the second connecting element extends at least for the greater part on the inner side of the plate-shaped body, the design of the holder element can readily conform to that of the mobile device in question. This also applies if the magnitude of the second spring force does not increase during the movement from the connecting position to the disconnecting position and/or if no rectilinear guidance is provided by the guide of the hook members. Thus there is provided a combination of a connecting element and a second connecting element, wherein the connecting element is designed for use in combination with the second connecting element, wherein the first connecting element and second connecting element can be manually connected to and disconnected from each other.

The first connecting element may comprise mounting equipment for mounting the connecting element in the environment where the first connecting element is to be used, the first connecting element comprising a base body, two opposite hook members, each provided with a hook edge for engagement behind two respective directly opposed second hook edges forming part of the second connecting element, which two hook edges are positioned directly opposite each other, facing away from each other, the hook members being movable towards each other against spring force and, on account of the spring force, away from each other relative to the base body between a connecting position, in which the hook edges can engage behind the associated second hook edge of the second connecting element, and a disconnecting position, in which the hook edges are detached from the associated second hook edges of the second connecting element.

The first connecting element further comprises a stop surface for abutment, in the connecting position, under a spring force against a second stop surface, which forms part of the second connecting element and which is directed towards the hook edges of the second connecting element. The first connecting element, in a connected condition thereof, is clamped between the hook edges and the second stop surface of the second connecting element with the first connecting element's hook edges and stop surface in the connecting position.

The second connecting element forms part of a holder element which is provided with a plate-shaped body which is provided with upright edges along at least part of the circumferential edge on the inner side for clampingly accommodating a mobile device with a flat display therebetween. The second connecting element is connected to the plate-shaped body, wherein the second connecting element extends at least for the greater part on the inner side of the plate-shaped body.

The disclosure also relates to a holder element for use in a combination as described in the foregoing. Within the framework of this holder element holding the mobile device, it may be preferable, specifically in the case of mobile devices having a convex rear side, if the plate-shaped body has an at least substantially convex shape.

In order to ensure that the design will mar the design of the mobile device as little as possible, the plate-shaped body may furthermore be free from projecting parts on the outer side thereof.

In order to realize a well-balanced load on the connection between the first connecting element and the second connecting element, the second connecting element may be centrally provided in the plate-shaped body.

Figure 1A:
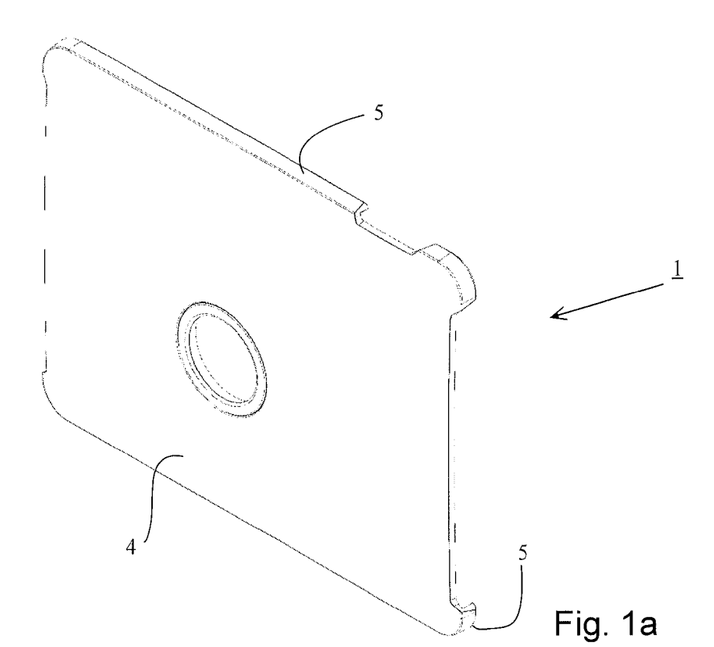
FIG. 1a is an isometric view of the outer side of a holder element according to the present disclosure.

The disclosure will now be explained in more detail by means of a description of three possible embodiments of the present disclosure, in which reference is made to the following figures:

FIG. 1a shows the outer side of a casing 1. The casing 1 comprises a clamping part 2 of plastic material and a connecting ring 3 (see also FIG. 1b). The clamping part 2 is provided with a slightly convex plate-shaped body 4, along part of the rectangular circumference of which, and at least at the location of the corners of the rectangular circumference of which upright edges 5 are provided on the inner side of the plate-shaped body 4, within which a mobile device 6 can be clampingly accommodated. To retain the mobile device 5 in place, the upright edges 5 are provided with inwardly extending retaining edges along at least part of the length, for example not at the corners. The retaining edges are capable of retaining the mobile device 6 along the circumference thereof. The upright edges 5 are in any case interrupted at those locations where the mobile device 6 is provided with control buttons 8, or where other means are provided, such as a loudspeaker, a microphone, a connection to a power source or a data transfer connection.

Figure 1B:
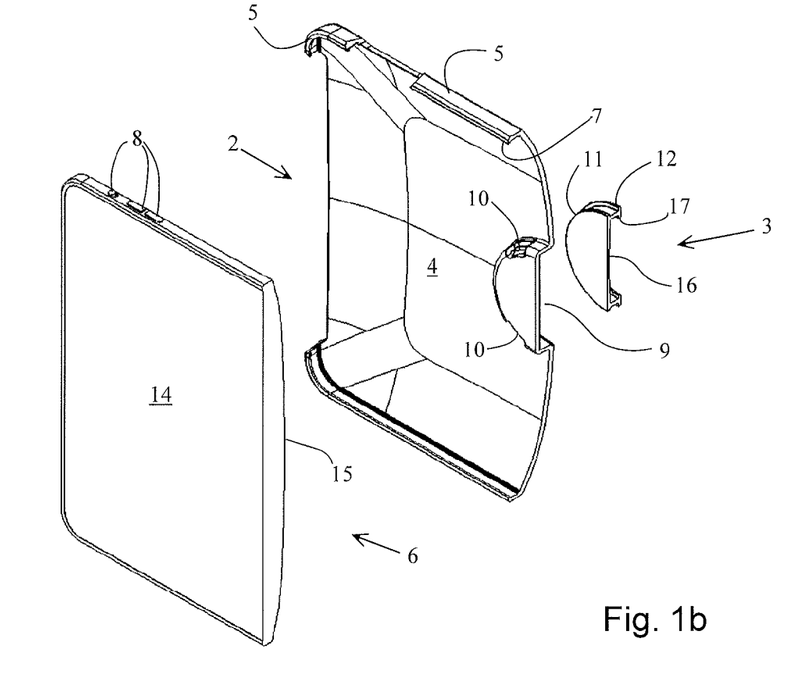
FIG. 1b is an isometric, exploded view of the inner side of a cut-in-half holder element as shown in FIG. 1a in combination with a cut-in-half mobile device.

Provided centrally in the plate-shaped body 4 is a circular recessed part 9. A connecting ring 3 is clampingly accommodated in the recessed part 9. The recessed part 9 is provided with (at least) three snap edges 10, two of which are shown in FIG. 1b. The snap edges 10 clampingly cooperate with an outwardly extending circular snap edge 11 as provided at the bottom side of the connecting ring 3. On one side, hereinafter called the bottom side, the connecting ring 3 is provided with a stop surface 16.

On the open side of the connecting ring 3 opposite the bottom side of the connecting ring 3, the connecting ring 3 comprises a second outwardly extending circular edge 12, whose side 13 facing the snap edge 11 abuts against the outer side of the plate-shaped body 4. Opposite the circular edge 12, the connecting ring 3 further comprises an inwardly extending hook edge 17 with a point directed towards the bottom 16, a hook surface 19 and a guide surface 20, which surfaces 19, 20 have a straight configuration and a curved configuration, respectively, seen in longitudinal sectional view (see also FIG. 3a).

The surface 19, which is in fact a circumferential surface, defines a conical shape having an apex of 160 degrees for the connecting ring 3 as it is configured in combination with a first connecting element 101 yet to be described. The surface 19 is oriented perpendicularly to the central axis of the connecting ring 3 for use in combination with connecting means 201 and 301 yet to be described.

On the front side, the mobile device 6 comprises a large touch-screen type display 14. The rear side 15 of the housing of the mobile device 6 is convex in shape. The convexity of the plate-shaped body 4 is slightly greater than that of the rear side 15, whilst the thickness of the mobile device at the location of the circumferential edge thereof is at least substantially the same as the height of the upright edges 5. Because of the greater convexity of the plate-shaped body 4, there is sufficient space for the recessed part 9. The connecting ring 3 therefore extends largely on the inner side of the outer side of the plate-shaped body 4. The design of the casing 9 conforms as much as possible to that of the mobile device 6, such as an iPad®, for example, the more so because no projecting parts are present on the outer side of the casing 1.

Figure 2:
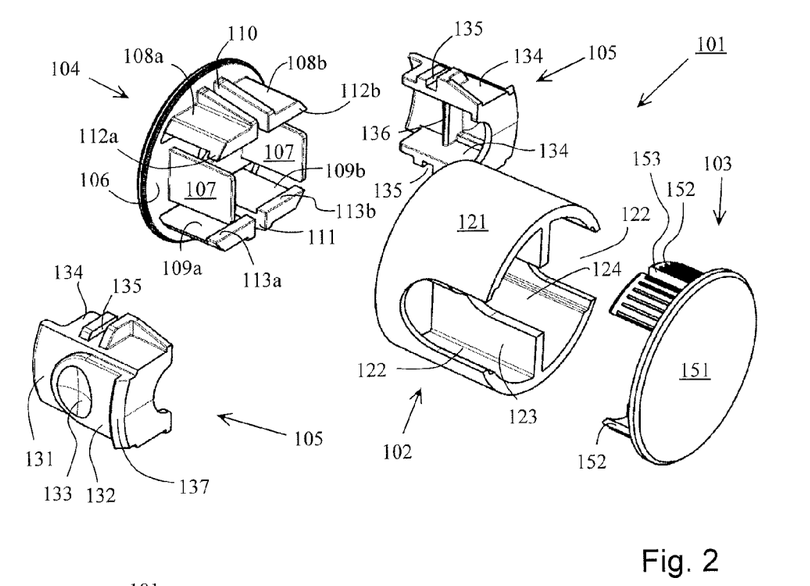
FIG. 2 is an exploded view of a first embodiment of a first connecting element according to the disclosure.

FIG. 2 is an exploded view of a first possible embodiment of a first connecting element 101 to which and from which the casing 1 can be manually connected and disconnected, respectively, via the connecting ring 3 thereof. The first connecting element 101 comprises a cylindrical sleeve part 101, a stop part 103, a bottom part 104 opposite the stop part 103 and two opposite control parts 105.

Figure 3A:
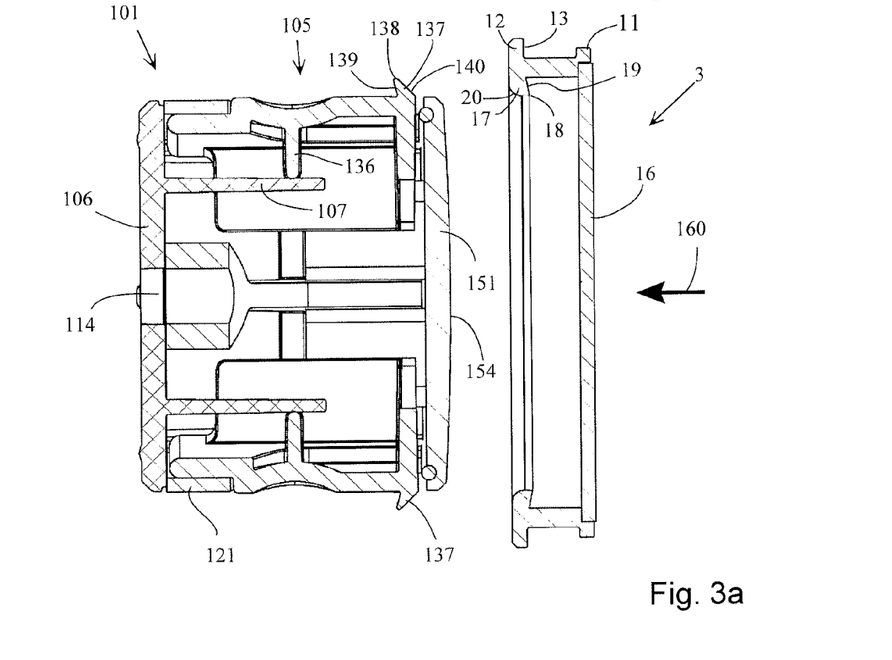
FIGS. 3a-3c are longitudinal sectional views of the connecting element of FIG. 2 in combination with a second connecting element during three successive stages of the connecting together of the connecting element and the second connecting element.

The bottom part 104 comprises a disc part 106 whose circumference corresponds to the cylindrical shape of the sleeve part 102, which disc part 106 closes the open rear side of the sleeve part 102 in the assembled condition (see also FIG. 3a). Two opposite spring lips 107 and two pairs of guide members 108a, 108b and 109a, 109b extend perpendicularly to the disc part 106. Gaps 110, 111 are present between guide members 108a and 108b as well as between guide members 109a, 109b. Each of the guide members 108a, 109b is provided, at the free ends thereof, with guide edges 112a, 112b, 113a, 113b extending parallel to the disc part 106, with the guide edges 112a, 113a, facing each other, just like the guide edges 112b, 113b, whilst the guide edges 112a, 112b are longitudinally aligned with each other, just like the guide edges 113a, 113b.

A hole 114 is centrally provided in the disc part 106, via which hole the bottom part 104 and thus, in the assembled condition, the entire first connecting element 101 can be fixed to a wall. As an aside it is noted that it is also possible within the framework of the present disclosure not to fix the first connecting element 101, or at least a first connecting element according to the disclosure, directly to a wall, but, for example, mount it to the end of an arm which may be pivoted, articulated or telescopic, for example. The other end of the arm may be fixed to a wall or, for example, be connected to a support which can be attached to a car seat. The first connecting element 101 may also be directly mounted to such as support.

The sleeve part 102 comprises a cylindrical wall 121. Recesses 122 are provided in two opposite sides of the cylindrical wall 121, on the side of the stop part 103. Turned through 90 degrees relative to the recess, a positioning wall 123 may extend between two opposite parts of the cylindrical wall 121, on the inner side thereof, in which positioning wall a recess 124 comparable to the recesses 122 is provided.

In assembled condition, the guide parts 108a-109b, as well as the spring lips 107 of the bottom part 104, extend on the inner side of the cylindrical wall 121, whilst positioning wall 123 is partially accommodated in the gaps 110, 111.

The operating parts 105 may have a curved wall portion 131, which concentrically abuts against the inner side of the cylindrical wall 121 in the assembled condition. Located adjacent to the curved wall portion 131 is an elevated wall portion 132, which may be provided with a cup-shaped recess 133, via which a user can operate the operating part 105 in question with one of his or her fingers. The elevated wall portions 132 fill the recesses 122, their outer sides being aligned with the outer side of the wall 121. Located adjacent to the curved wall part 131 are two inwardly extending parallel positioning walls 134. On the outer side thereof, upright edges form a guide groove 135.

In the assembled condition, the guide edges 112a-113b fall within the four grooves 135, making guiding cooperation possible. A rib 136 extends between the positioning walls 134 of each of the operating parts 105, which rib cooperates with one of the spring lips 107 in use. At the upper side of the elevated wall portion 132, the operating parts 105 comprise a hook edge 137 having a point 108 which is directed towards the bottom side of the first connecting element 101, which point is defined by a hook surface 139 of an obliquely oriented contact surface 140.

The stop part 103, to conclude, comprises a disc-shaped cap part 151. The cap part 151 closes the open upper side of the sleeve part 102 in the assembled condition. Two curved wall portions 152 extend from the cap part 151. In the middle of their length, a gap 153 is present in the wall portions 152. In the assembled condition of the first connecting element 101, part of the positioning wall 123 extends within the gap 153. The curvatures and positioning of the curved wall portions 152 are such that the wall portions clampingly abut against the inner side of the cylindrical wall 122 so as to fix the stop part 103 in position relative to the sleeve part 102 in the assembled condition.

The first connecting element 101 function is as follows. The casing 1 is positioned opposite the first connecting element 101, such that the connecting ring 3 of the casing 1 is positioned concentrically and directly opposite the first connecting element 101, with the cap part 151 provided with the stop surface 154 facing the open side of the connecting ring 3 (FIG. 3a). From this position, the casing 1 (and thus the connecting ring 3) is moved in the direction of the arrow 160 towards the first connecting element 101. Simultaneously therewith, the operating parts 105 are operated with two fingers in the directions 161, more specifically moved towards each other, as a result of which the distance between the points 138 of the respective operating parts 105 becomes smaller than the internal diameter of the hook edge 17. During the movement, the ribs 136 press against the spring lips 107, causing the clips to deform elastically and create a mechanical resistance. In an alternative manner of connecting, which may be used more often in practice, the casing 1 is moved in the direction of the arrow 160 towards the first connecting element 101 without the operating parts being operated. During the movement, the circumferential guide surface 20 comes into contact with the two contact surfaces 140. Because of the oblique orientation of the contact surface 130, the guide surface will push the operating parts 105 inwards upon further movement in the direction of the arrow 160, with a guiding cooperation taking place between the guide grooves 135 and the guide edges 112a-113b.

Figure 3B:
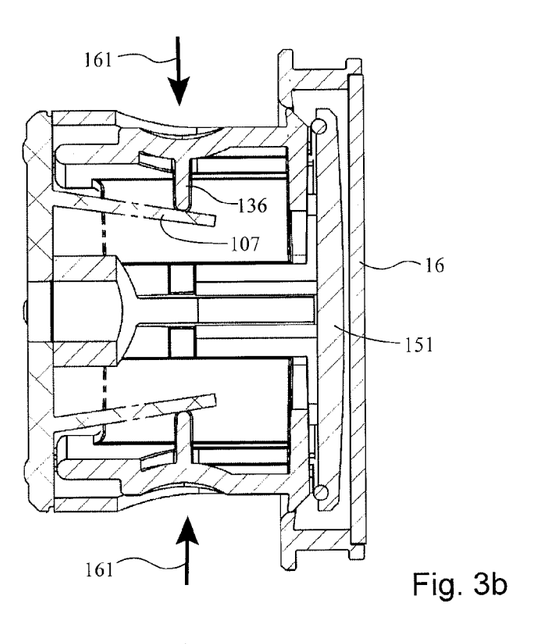

FIG. 3b shows a situation in which the hook edge 17 is about to pass the hook edges 137, irrespective of the fact whether the inward movement of the operating parts 105 has taken place as a result of the operating parts being operated or as a result of the contact surfaces 140 sliding along the guide surface 20 as described above. The cap part 151 is just clear of the bottom 16 yet.

Figure 3C:
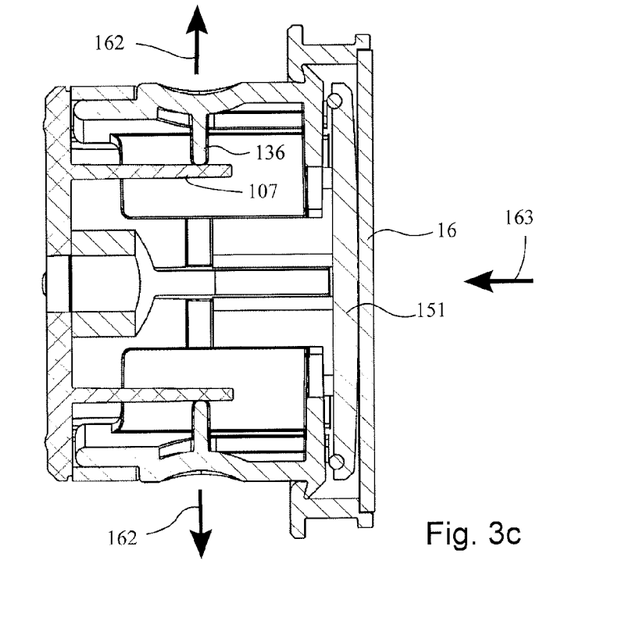

FIG. 3c shows the connected condition of the connecting ring 3 and the first connecting element 101. The connecting ring 3 has been moved yet further in the direction of the arrow 160 (see the arrow 163) towards the first connecting element 101, as a result of which the cap part 151 has come to abut against the bottom 16. This has resulted in the convex stop surface being slightly flattened against the action of the elastic material of which the cap part 151 is made. Any external forces in the direction indicated by the arrows 161 have been released, allowing the operating parts 105 to return the starting position shown in FIG. 3a under the influence of the spring action of the spring lips 107, with the circular hook edge 17 hooking fully behind the two hook edges 137 of the two operating parts 105. In the connected condition shown in FIG. 3c it is possible, because of the circular configuration of the hook edge 137 and the hook edge 17, to turn the connecting ring 3, and with it the casing 1, concentrically relative to the first connecting element 101, so that the mobile device 6 can be positioned in a desired orientation.

Because of the elastic abutment of the cap part 151 against the bottom 16, the first connecting element 101 is accommodated in the connecting ring 3 with a clamped fit. The clamped fit is quite robust, since any tendency of the connecting ring 3 to be disconnected from the first connecting element 101, for example when someone accidentally bumps against the casing 1, will cause the magnitude of the clamping force to increase. The reason for this is that a disconnection can only be brought about by pushing the cap part 151 further against the bottom 16. The increased clamping force is provided by the obliqueness of the hook surfaces 139 and 19, which must necessarily slide past each other in radial direction before disconnection is possible. In spite of the above, intentional disconnection can be realised in a simple manner by depressing the operating parts 105 in the direction of the arrows 161 from the connected condition, i.e., both against the spring action of the spring lips 107 and against the spring action of the cap part 151. The depressing of the operating parts 105 in the direction of the arrows 161 may be done with two fingers of different hands whilst the casing 1 and the mobile device 6 clamped therein is simultaneously taken hold of with the hands in question, so that the mobile device 6 present in the casing 1 will not fall the moment the disconnection is effected. As soon as the points 138 of the two operating parts 105 pass the point 18 of the hook edge 17 (which point 18 forms part of a circumferential hook edge), seen in radial direction, the casing 1 can be moved away from the first connecting element 101 in a direction opposite the direction indicated by the arrow 163 and the disconnection is complete.

Figure 4:
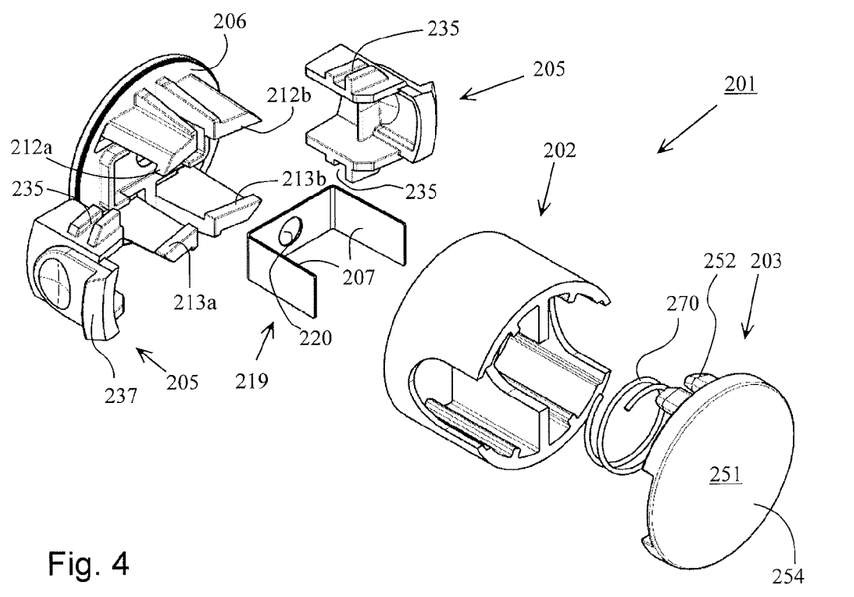
FIG. 4 is an exploded view of a second embodiment of a first connecting element according to the disclosure.
Figure 5A:
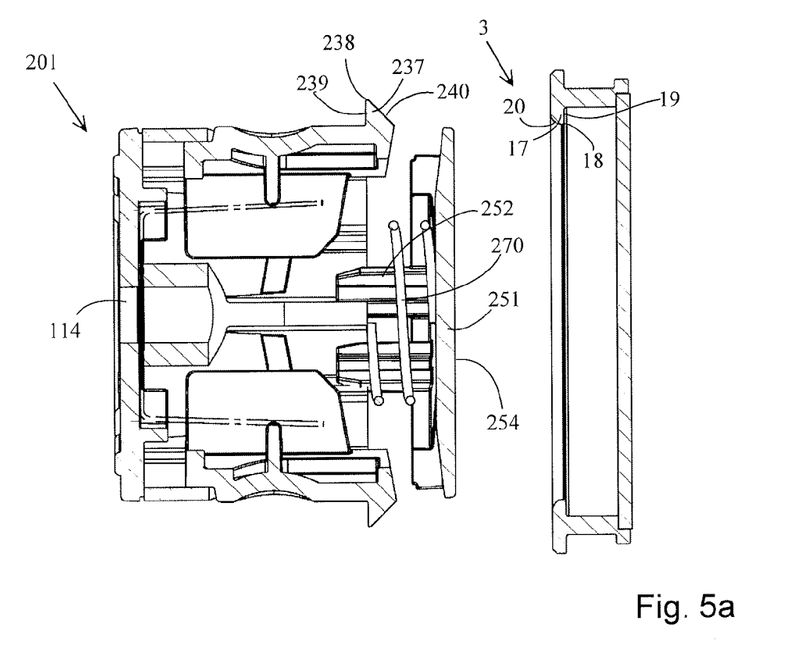
FIGS. 5a-5c are longitudinal sectional views of the connecting element of FIG. 4 in combination with a second connecting element during three successive stages of the connecting together of the first connecting element and the second connecting element.
Figure 5B:
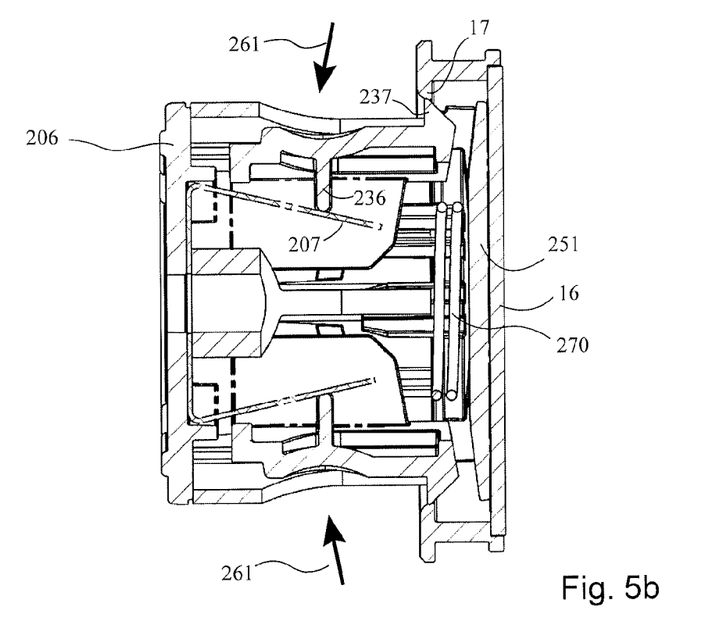
Figure 5C:
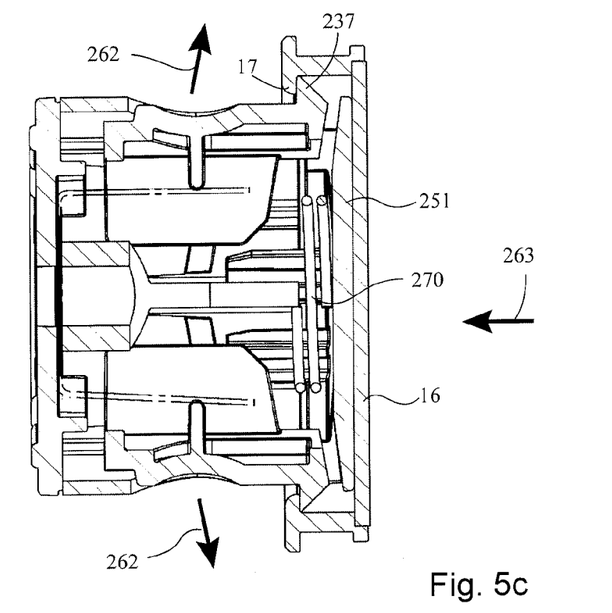

FIGS. 4-5c relate to a second possible embodiment of a first connecting element according to the disclosure. The first connecting element, which will be indicated by numeral 201, is quite similar to the first connecting element 101. Like parts will be indicated by the same numerals augmented by 100. Hereinafter the first connecting element 201 will only be explained insofar as it is different from the first connecting element 101.

The stop part 203 has a cap part 251 comprising a flat (rather than convex) stop surface 254. The stop part 203 is further provided with guide parts 252, which, for reasons yet to be explained hereinafter, make reciprocating axial movement of the stop part 203 relative to the sleeve part 202 possible. Between the stop part 203 and the sleeve part 202, the first connecting element 201 comprises a compression spring 270. Furthermore, the spring lips 107 of the first connecting element 101 have been replaced by a leaf spring element 219 provided with spring legs 207. The leaf spring element 219 is provided with a hole 220 in line with the hole 114, through which a screw can extend, by means of which the first connecting element 201 can be mounted or fixed to a wall, for example. The first connecting element 201 is furthermore different from the first connecting element 101 as regards the orientation of the guide edges 212a-213b and, connected therewith, of the grooves 135, which are V-shaped, seen in side view, with an apex, also to be referred to as guide angle, in the order of 160 degrees, with the point of the V-shaped directed away from the stop surface 254. Another difference is the orientation of the hook surface 239, which extends fully perpendicularly to the central axis of the first connecting element 201. Related thereto, also the hook edge 19 of the connecting ring 3 that is used in combination with the first connecting element 201 is oriented perpendicularly.

The operation of the combination of the first connecting element 201 with the connecting ring 3, or the casing 1, is comparable to the operation for connecting/disconnecting the first connecting element 101 to/from the connecting ring 3 as discussed in the foregoing. To effect a connection from the starting situation as shown in FIG. 5a, the operating parts 205 are depressed in the direction of the arrows 261 (FIG. 5b), causing the operating parts to move slightly in the direction of the disc part 206 due to the above-described oblique orientation of the guide edges 212a-213b and the guide grooves 235. In an alternative operating method, such a movement can also be realised by pressing the guide surface 20 against the contact surface 240.

The distance between the points 238 of the hook edges 237 becomes so small that the hook edge 17 of the connecting ring 3 can move past the hook edges. Inward movement of the operating parts 205 is opposed by the bending of the spring legs 20, against which the ribs 236 strike. During the movement of the connecting ring 3 around the stop part 203, the stop surface 254 of the cap part 251 comes into contact with the bottom 16, causing the compression spring 270 to be depressed. Upon being released, the operating parts 205 move back in the direction of the arrows 262 until the connected condition shown in FIG. 5c is reached. In this condition the compression spring 270 is under compression stress.

The connection between the connecting ring 3 and the first connecting element 201 that is obtained in this manner is quite stable. To disconnect the two, if desired, the operating parts 206 must be moved in the direction of the arrows 261. This is opposed by the spring legs 207, but also by the compression spring 270, because the sleeve element 202 and thus the operating parts 105 must initially move in the direction of the stop part 203, against the action of the compression spring 270, on account of the oblique orientation of the guide edges 212a-213b and the guide grooves 235 and the perpendicular orientation of the hook surfaces 19 and 239, before the circumferential hook edge 17 can pass the two edges to 37 on the outer side thereof and disconnection is complete.

Figure 6:
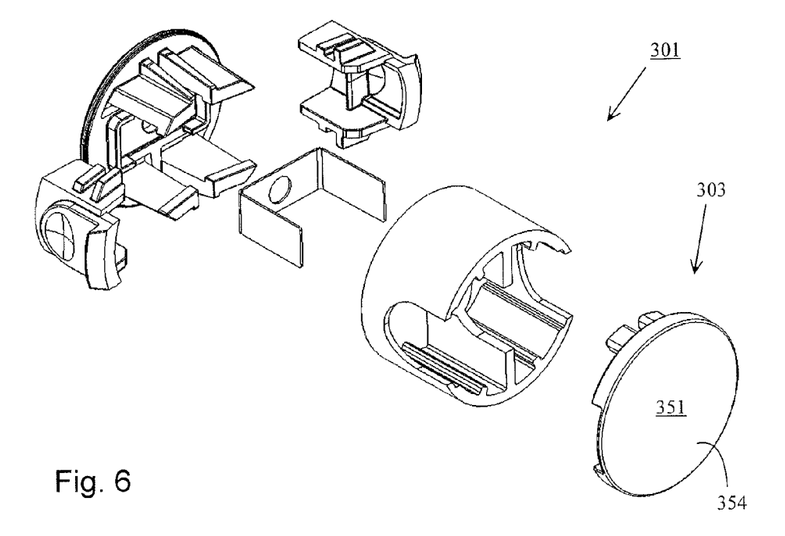
FIG. 6 an exploded view of a third embodiment of a first connecting element according to the disclosure.
Figure 7A:
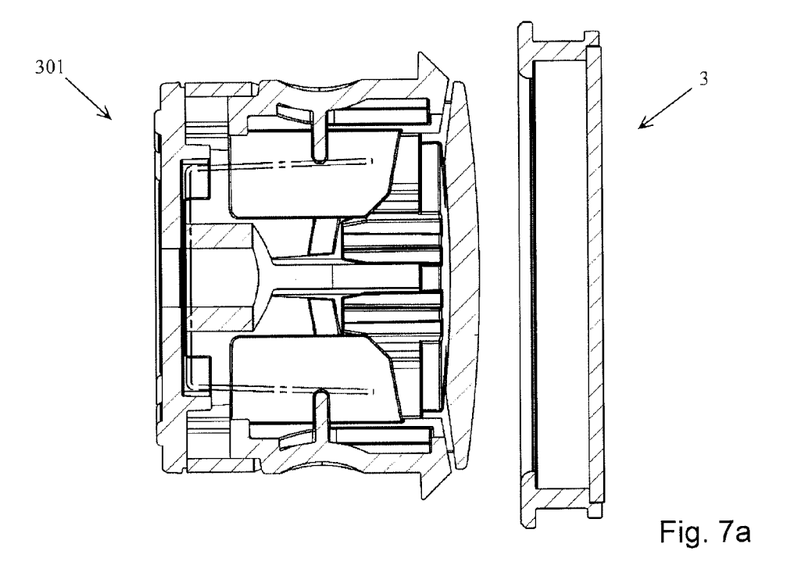
FIGS. 7a-7c are longitudinal sectional views of the first connecting element of FIG. 6 in combination with a second connecting element during three successive stages of the connecting together of the connecting element and the second connecting element.
Figure 7B:
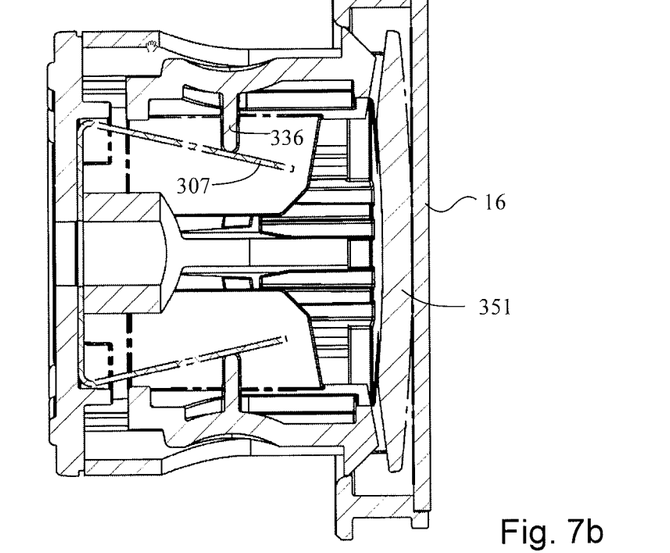
Figure 7C:
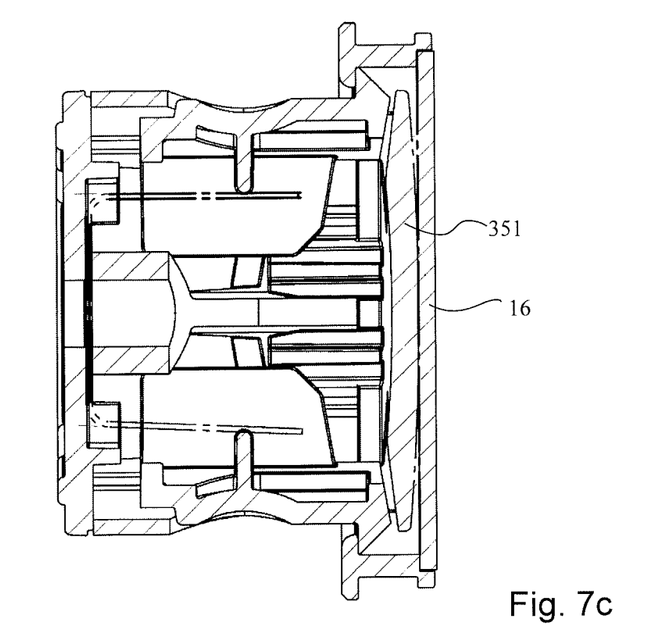

FIGS. 6-7c relate to a third possible embodiment of a first connecting element according to the disclosure. The first connecting element, which will be indicated by numeral 301, is quite similar in particular to the first connecting element 201, but also to the first connecting element 101. Accordingly, like parts will hereinafter be indicated by the same numerals, augmented by 100 in comparison with the numerals associated with the first connecting element 201 and by 200 in comparison with the numerals associated with the first connecting element 101. Hereinafter the first connecting element 301 will only be explained insofar as it is different from the first connecting element 201.

The first connecting element 301 is only different from the first connecting element 201 as regards the configuration of the stop part 303. The cap part 351 thereof is made of an elastic material and has a convex stop surface 354, like the stop surface 254 for the first connecting element 201. The convex elastic cap part 351 has taken over the function of the compression spring 270, which is not used in the first connecting element 301.

The operation of the first connecting element 301 in combination with the connecting ring 3 and the manner of operating the same are comparable to those of the first connecting element 201 described in the foregoing. The action of the compression spring 270, however, has been substituted for the elastic action of the cap part 251, which is slightly depressed in the connected condition shown in FIG. 7c, and which will necessarily have to be depressed further to effect a disconnection.

Although the first connecting elements 101, 201 and 301 have been described in the foregoing in a situation in which they are fixed to a wall, it is readily possible within the framework of the present disclosure to attach first connecting elements according to the disclosure, such as the first connecting elements 101, 201, 301, to a mount that my comprise the end of a manipulable or non-manipulable arm, for example an articulated or telescopic arm, so that an even greater degree of freedom is created for the user in spatially positioning a mobile device in a desired orientation or in a desired position.

The invention claimed is:

1. A first connecting element for use in combination with a second connecting element, the first connecting element and second connecting element being configured to be manually connected to and disconnected from each other, the first connecting element comprising:
   mounting equipment for mounting the first connecting element in an environment where the first connecting element is to be used;
   a base body; and
   two opposite hook members, each provided with a hook edge for engagement behind two respective directly opposed hook edges forming part of the second connecting element, the two hook edges of the first connecting element being positioned directly opposite each other and facing away from each other,
   wherein the hook members are configured to be movable towards each other against a first spring force and, on account of the spring force, away from each other relative to the base body between a connecting position, in which the hook edges of the first connecting element engage behind the associated hook edges of the second connecting element, and a disconnecting position, in which the hook edges of the first connecting element are detached from the associated hook edges of the second connecting element, wherein the first connecting element further comprises a stop surface for abutment, in the connecting position, under a second spring force against a second stop surface which forms part of the second connecting element and which is directed towards the hook edges of the second connecting element, wherein the first connecting element, in a connected condition thereof, is clamped between the hook edges and the second stop surface of the second connecting element by the first connecting element's hook edges and stop surface, and wherein the magnitude of the second spring force increases upon movement, in the connected condition, from the connecting position to the disconnecting position, the first connecting element further comprising guide for guiding the movement of the first connecting element's hook members between the connecting position and the disconnecting position relative to the base body, the guide comprising a guide part of the base body for each of the hook members and guide members forming part of each of the hook members, which guide members are configured to guide in respective straight guide directions by the associated guide upon movement of the hook members between the connecting position and the disconnecting position.

2. The first connecting element of claim 1, wherein the two guide directions include a guide angle with each other and wherein the point of the guide angle is oriented away from the stop surface.

3. The first connecting element of claim 2, wherein the magnitude of the guide angle ranges between 140 degrees and 175 degrees.

4. The first connecting element of claim 1, wherein the two hook edges of the first connecting element each have a hook surface, which hook surfaces include a hook angle relative to each other, and wherein the point of the hook angle is oriented in the direction of the stop surface on the first connecting element.

5. The first connecting element of claim 4, wherein the magnitude of the hook angles ranges between 140 degrees and 175 degrees.

6. The first connecting element of claim 1, wherein the stop surface of the first connecting element forms part of a stop member made of a resilient material for providing the second spring force obtained as a result of the stop member being depressed upon abutment of the stop surface against the stop surface of the second connecting element.

7. A combination of a first connecting element and a second connecting element, the first connecting element and second connecting element being configured to be manually connected to and disconnected from each other, the first connecting element comprising:
- mounting equipment for mounting the first connecting element in an environment where the first connecting element is to be used;
- a base body; and
- two opposite hook members, each provided with a hook edge for engagement behind two respective directly opposed hook edges forming part of the second connecting element, the two hook edges of the first connecting element being positioned directly opposite each other and facing away from each other, wherein the hook members are configured to be movable towards each other against a first spring force and, on account of the spring force, away from each other relative to the base body between a connecting position, in which the hook edges of the first connecting element engage behind the associated hook edges of the second connecting element, and a disconnecting position, in which the hook edges of the first connecting element are detached from the associated hook edges of the second connecting element, wherein the first connecting element further comprises a stop surface for abutment, in the connecting position, under a second spring force against a second stop surface which forms part of the second connecting element and which is directed towards the hook edges of the second connecting element, wherein the first connecting element, in a connected condition thereof, is clamped between the hook edges and the second stop surface of the second connecting element by the first connecting element's hook edges and stop surface, and wherein the magnitude of the second spring force increases upon movement, in the connected condition, from the connecting position to the disconnecting position, the first connecting element further comprising guide for guiding the movement of the first connecting element's hook members between the connecting position and the disconnecting position relative to the base body, the guide comprising a guide part of the base body for each of the hook members and guide members forming part of each of the hook members, which guide members are configured to guide in respective straight guide directions by the associated guide upon movement of the hook members between the connecting position and the disconnecting position.

8. The combination of claim 7, wherein the second connecting element is at least substantially ring-shaped, into which ring shape the connecting element being configured to be partially inserted upon connection of the first connecting element to the second connecting element, wherein the second connecting element is provided with it's stop surface on the side of the ring shape that is remote from the first connecting element in the connected condition.

9. The combination of claim 8, wherein the hook edges of the second connecting element form part of a circular edge.

10. The combination of claim 7 wherein the second connecting element forms part of a holder element which is provided with a plate-shaped body which is provided with upright edges along at least part of the circumferential edge on the inner side, wherein the holder element is configured to clampingly accommodate a mobile device with a flat display therebetween, wherein the second connecting element is connected to the plate-shaped body.

11. The combination of claim 10, wherein the second connecting element extends at least for the greater part on the inner side of the plate-shaped body.

12. The combination of claim 10, wherein the plate-shaped body has an at least substantially convex shape.

13. The combination of claim 10, wherein the second connecting element is centrally provided in the plate-shaped body.

14. The combination of claim 10, wherein the plate-shaped body is free from projecting parts on the outer side thereof.

15. A holder element for use in the combination according to claim 10.

16. A combination of a first connecting element and a second connecting element, the first connecting element and second connecting element being configured to be manually connected to and disconnected from each other, the first connecting element comprising:
- mounting equipment for mounting the first connecting element in an environment where the first connecting element is to be used;
- a base body; and
- two opposite hook members, each provided with a hook edge for engagement behind two respective directly opposed hook edges forming part of the second connecting element, the two hook edges of the first connecting element being positioned directly opposite each other and facing away from each other,
- wherein the hook members are configured to be movable towards each other against a first spring force and, on account of the spring force, away from each other relative to the base body between a connecting position, in which the hook edges of the first connecting element engage behind the associated hook edges of the second connecting element, and a disconnecting position, in which the hook edges of the first connecting element are detached from the associated hook edges of the second connecting element,
- wherein the first connecting element further comprises a stop surface for abutment, in the connecting position, under a second spring force against a second stop surface which forms part of the second connecting element and which is directed towards the hook edges of the second connecting element,
- wherein the first connecting element, in a connected condition thereof, is clamped between the hook edges and the second stop surface of the second connecting element by the first connecting element's hook edges and stop surface, and
- wherein the second connecting element forms part of a holder element which is provided with a plate-shaped body which is provided with upright edges along at least part of the circumferential edge on the inner side, wherein the holder element is configured to clampingly accommodate a mobile device with a flat display therebetween, wherein the second connecting element is connected to the plate-shaped body.

* * * * *